(12) United States Patent
Manhart et al.

(10) Patent No.: US 11,141,779 B2
(45) Date of Patent: Oct. 12, 2021

(54) METHOD AND DEVICE FOR DETECTING VARIABLES IN THE OUTLET OF A METALLURGICAL VESSEL

(71) Applicant: Refractory Intellectual Property GmbH & Co. KG, Vienna (AT)

(72) Inventors: Christian Manhart, Bruck a.d. Mur (AT); Goran Vukovic, Vienna (AT); Klaus Gamweger, Trofaiach (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 119 days.

(21) Appl. No.: 16/464,480

(22) PCT Filed: Nov. 3, 2017

(86) PCT No.: PCT/EP2017/078175
§ 371 (c)(1),
(2) Date: May 28, 2019

(87) PCT Pub. No.: WO2018/099685
PCT Pub. Date: Jun. 7, 2018

(65) Prior Publication Data
US 2019/0375001 A1  Dec. 12, 2019

(30) Foreign Application Priority Data
Nov. 29, 2016 (WO) .................. PCT/EP2016/079100
Jun. 1, 2017 (EP) ..................................... 17174075

(51) Int. Cl.
*B22D 41/08* (2006.01)
*B22D 41/36* (2006.01)
(Continued)

(52) U.S. Cl.
CPC ............. *B22D 2/001* (2013.01); *B22D 41/08* (2013.01); *B22D 41/24* (2013.01); *B22D 41/36* (2013.01); *B22D 41/60* (2013.01)

(58) Field of Classification Search
CPC ........ B22D 2/001; B22D 2/005; B22D 41/08; B22D 41/36; B22D 41/60; B22D 41/24
See application file for complete search history.

(56) References Cited

U.S. PATENT DOCUMENTS

| 4,810,988 A | 3/1989 | Beecher et al. |
| 4,816,758 A | 3/1989 | Theissen et al. |

(Continued)

FOREIGN PATENT DOCUMENTS

| DE | 19651534 A1 | 2/1998 |
| DE | 19644345 A1 | 4/1998 |

(Continued)

OTHER PUBLICATIONS

Abstract of JPS5930468.
Abstract of DE19644345.

*Primary Examiner* — Scott R Kastler
(74) *Attorney, Agent, or Firm* — Brian Roffe

(57) ABSTRACT

With a method for detecting variables in an outlet of a metallurgical vessel, different variables in the outlet are detected or measured by at least one coil surrounding the outlet channel and/or an induction coil of an induction heater as a monitoring system, wherein the variables relate to the slag portion when pouring out the metal melt, wear condition of refractory parts in the outlet channel, the solidified metal melt, flow rate and/or plugging mass in the outlet channel. After evaluation, a closure element for the outlet is actuated, heating of the metal in the outlet channel is activated and/or renewal of the outlet channel is triggered. In this way, optimum operation in the pouring of metal melt out of a vessel is simply achieved, wherein occurrence of (Continued)

irregularities are detected during the entire pouring, and pouring out of slag can be successfully prevented at the end of the pouring.

19 Claims, 2 Drawing Sheets

(51) Int. Cl.
  *B22D 2/00* (2006.01)
  *B22D 41/24* (2006.01)
  *B22D 41/60* (2006.01)

(56) References Cited

U.S. PATENT DOCUMENTS

| | | | |
|---|---|---|---|
| 4,859,940 A | 8/1989 | Hummert et al. | |
| 4,887,798 A | 12/1989 | Julius | |
| 5,939,016 A | 8/1999 | Abramovich et al. | |
| 6,210,629 B1 | 4/2001 | Bruckner et al. | |
| 8,771,587 B2 | 7/2014 | Amster et al. | |
| 10,799,949 B2 * | 10/2020 | Vukovic | B22D 2/001 |
| 2019/0375001 A1 * | 12/2019 | Manhart | B22D 41/46 |

FOREIGN PATENT DOCUMENTS

| | | |
|---|---|---|
| EP | 0198910 B1 | 5/1986 |
| EP | 0306792 B2 | 3/1989 |
| EP | 0300150 B1 | 9/1993 |
| EP | 0942796 B1 | 5/2000 |
| EP | 2366474 A1 | 9/2011 |
| EP | 2318559 B1 | 10/2014 |
| EP | 3326753 B1 | 5/2018 |
| FR | 2532208 A1 | 3/1984 |
| JP | S5930468 A | 2/1984 |
| WO | 9815374 A1 | 4/1998 |
| WO | 2017093236 A1 | 6/2017 |
| WO | 2018099685 A1 | 6/2018 |

* cited by examiner

METHOD AND DEVICE FOR DETECTING VARIABLES IN THE OUTLET OF A METALLURGICAL VESSEL

FIELD OF THE INVENTION

The invention relates to a method for detecting variables relating to the spout of a metallurgical vessel wherein at least one coil surrounds an outlet opening or channel and a supply or evaluation unit connected thereto measures and evaluates the variables and wherein an alternating current with a predetermined frequency is produced by the supply unit in the respective coil, and a device for performing the method including a slide closure unit on the spout of the metallurgical vessel, which may be a copper-anode furnace, and which includes a housing in which refractory closure plates and at least one connecting refractory inner casing are arranged.

BACKGROUND OF THE INVENTION

According to the published document EP-A-0 306 792, a device for early detection of slag of a melt stream from a ladle containing molten metal is disclosed, in which a coil is provided, which surrounds a pouring spout under the ladle outlet. This detector coil generates a current, by means of which variations of the electrical conductivity of the outflowing metal melt due to slag are reflected by corresponding variations of the impedance of this detector coil and are measured by the evaluation means. For this purpose, a circuit with signal amplification is provided, which comprises this detector coil and an adjustable capacitor for setting the resonance frequency, so that the capacitive reaction of the circuit due to the presence of this capacitor eliminates the inductive reaction of the circuit, leaving only an impedance as a function of the resistance of the coil.

OBJECTS AND SUMMARY OF THE INVENTION

The object underlying the invention, a method for detecting of sizes in the spout of a metallurgical vessel to improve such that it enables an optimal use with the casting of metal melting and that moreover, it is guaranteed the full functional capability of the vessel during the entire pouring process.

According to the invention, this object is achieved by a method including the steps of heating the metal melt in the outlet channel using an induction coil of an induction heater, the induction coil surrounding the outlet channel, and monitoring, using a supply and evaluation unit electrically connected to the induction coil, the at least one variable, while the metal melt passes through the outlet channel and is being heated, by producing an alternating current with a predetermined frequency in the induction coil and determining impedance of the induction coil which varies relative to the at least one variable such that the at least one variable is determined based on the determined impedance. Based on the determined the at least one variable, a closure member for the spout is actuated, heating the metal in the outlet channel is undertaken and/or relining of the outlet channel is undertaken. An object of the invention may also be achieved by a device for performing the method, wherein the outlet opening is formed by a slide closure unit on the spout of the metallurgical vessel, the vessel includes a housing, refractory closure plates in the housing, and at least one connecting refractory inner casing in the housing, and the induction coil at least partially surrounds the refractory inner casing(s), and the supply and evaluation unit detects or measures the least one variable.

With this method according to the invention, the different variables are detected or measured by means of at least one coil in the spout and/or by means of an induction coil of an induction heater as monitor of the different variables in the spout, wherein it preferably involves the variables of slag proportion during pouring of the metal melt, the degree of wear of the refractory elements in the pouring channel, the solidified metal melt, the flow rate and/or plugging material in the pouring channel. In consequence, a closure member for the spout can be activated, metal in a pouring channel can be heated and/or the pouring channel can be renewed.

Thus, in a simple manner, it is possible to achieve optimum operation during pouring of the metal melt from a vessel, by recognizing the occurrence of irregularities throughout the whole pouring period and, moreover, pouring of slag at the end can be successfully prevented.

Furthermore, before or after pouring or when the melt has solidified in spout, it can be established very simply how much solidified melt or plugging material is contained therein.

Likewise, it is possible to detect and determine to what degree the refractory elements forming the spout have worn and at what point in time these will have to be replaced.

In addition, in this way, it is also possible to keep the melt in the pouring channel of the spout always hot enough for to prevent solidification before and/or during pouring of the melt or so that metal and/or slag that has possibly solidified in the pouring channel can be melted.

Consequently, even before pouring, with the slide closure in place, melt and/or slag solidified in the pouring channel can be melted even before pouring with the induction coil. The whole pouring procedure is thus carried out more securely and thereby more controllably and, in addition, it is possible to achieve a longer service for the refractory materials of the spout. Accordingly, the use of plugging material and drilling it out or melting of solidified melt or slag with a conventional lance can be avoided.

The invention proposes that the induction heater is composed of an induction coil surrounding the spout and an incorporated cooling system. This measure prevents the induction coil or its ferritic support being heated by brickwork or outer jacket of the furnace and the slide closure when heated in operation.

So that the heat output of the induction coil is concentrated on the pouring channel with as little loss as possible, the invention proposes that the induction coil is embedded in a support of ferritic material and the cooling system is provided with a cooling chamber peripherally surrounding the support as well as a cooling chamber abutting the side wall of the support body directed towards the furnace.

There is a further advantage of the cooling system of the induction coil, that it also enables a deliberate solidification of the melt or slag in the spout of a furnace with a closed slide closure or taphole. This can be detected and indicated accordingly with the coil. For example, this can serve as security against a breakthrough, to ensure safe operation of a furnace between two pouring procedures, which could be important with certain metallurgical furnaces, for example when its spout is situated below the bath level during operation.

The inner casing is provided in the region of the insert with a hard layer that protects the inner surface of the insert, made, for example, of clay material or SiC. The outflowing melt or the slag or the oxidizing gas, such as for example air, is/are thus prevented from attacking the insert. This protective effect may also be extended to the entire inner casing by the hard layer being extended beyond the insert.

BRIEF DESCRIPTION OF THE DRAWINGS

In the following, the invention is explained in more detail by means of an exemplary embodiment with reference to the drawings. These show as follows.

DETAILED DESCRIPTION OF THE INVENTION

Figure 1:
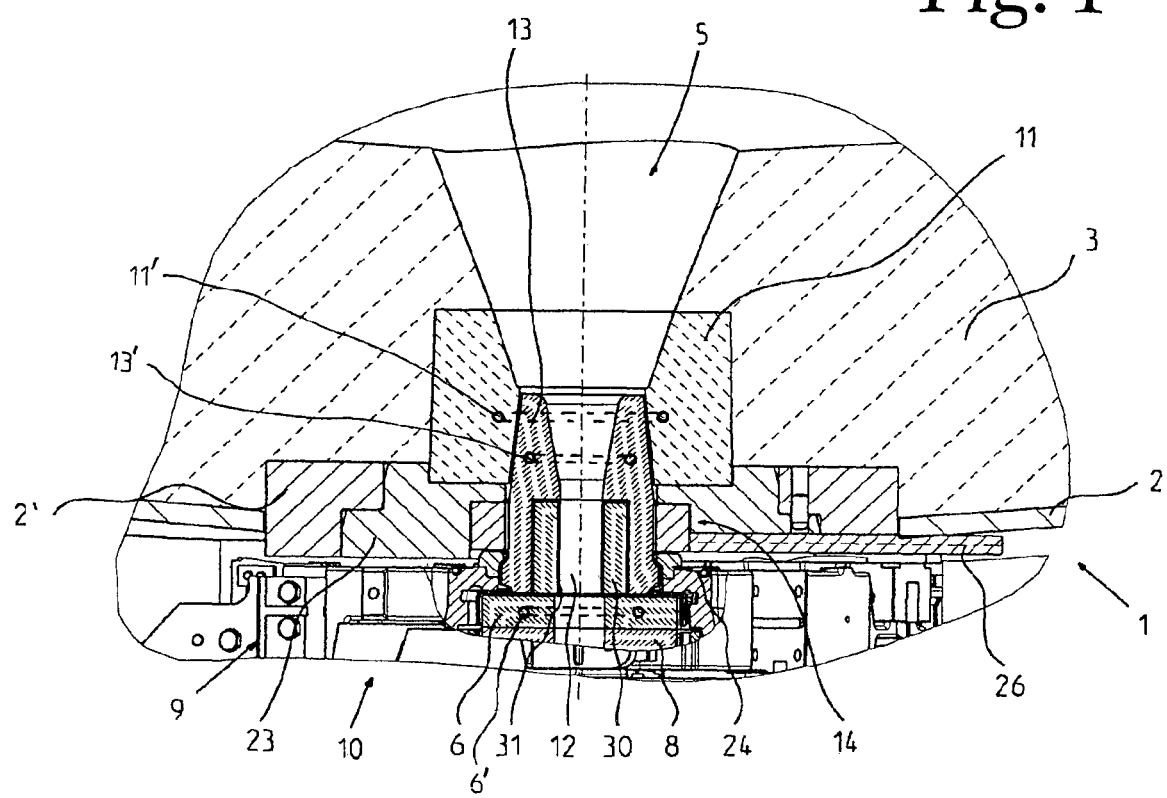
FIG. 1 is a partial cross-section or a partial view of a slide closure according to the invention and the spout of a copper anode furnace.

FIG. 1 shows the spout 5 of a metallurgical furnace, preferably a copper-anode furnace 1, which comprises an outer steel cladding 2 and a refractory lining 3. In the lining 3, this spout 5 is formed running radially outwards with a perforated brick 11 with the outlet opening 12.

The slide closure 10, is designed in a conventional manner, as closure system of the outlet opening 12 is arranged at the spout 5. The latter is provided with a housing 9 fastened to the outside of the furnace, into which housing at least one refractory closure plate 6 is inserted and an inner casing 13 adjoining above the latter is fastened detachably. This slide closure 10 additionally has a moveable refractory slider plate 8, as indicated, which is held in a unit (not detailed) and is pressed against the upper closure plate 6 and can be moved relative to the latter into an open or closed position of the slide closure.

On the spout 5, a removable induction heater 14 is situated, which has an induction coil 15 surrounding the inner casing 13 above the housing 9. Advantageously, there is assigned to the housing 9 a support ring 23 (also referred to as a support plate herein) which is fixed in a holding plate 2' fastened in the steel cladding 2 of the furnace 1.

With the method for detecting variables in the spout 5 of the copper anode furnace 1, it is provided that, by means of at least one coil surrounding the outlet channel 12 and a supply or evaluation unit connected by leads to this, these are measured and evaluated. Thus, an alternating current with predetermined frequency is produced by the supply unit in the respective coil and the impedance variations in the variables in the spout 5 and/or the induced current profile are measured by this evaluation unit.

According to the invention, this at least one coil, which is housed in a refractory element forming the pouring channel 12, as in the perforated brick 11, in an inner casing 13, in an annular insert 30, in a closure plate 6 of the slide closure 10, and/or this induction coil 15 surrounding the outlet channel 15 of an induction heater 14 is used, by means of which respectively the at least one, preferably multiple variables are detected or measured for monitoring in the spout, such as the slag proportion during pouring of the metal melt, the degree of wear of the pouring channel, solidified metal melt and/or plugging material in the pouring channel. Furthermore, by this monitoring, the flow rate can be determined and also gas inclusions in particular as gas bubbles in the outflowing melt can be assessed.

Following the evaluation, the slide closure 10 can be actuated, heating of the metal in the pouring channel 12 and/or renewal of this pouring channel 12 can respectively take place.

In FIG. 1, in addition to the induction coil 15, as an example, a coil 11' in the perforated brick 11, a coil 13' in the inner casing 13, and a coil 6' in the closure plate 6 are indicated as an example of possible positioning for this monitoring process. It is self-evident that with the method in accordance with the invention, respectively only the induction coil 15, or preferably, in addition, only one of the indicated coils 6', 11', 13' can be used for detection of the different variables in the spout 5 and therewith sufficient results can be obtained. The induction coil 15 can also be used for heating, however.

Figure 3:
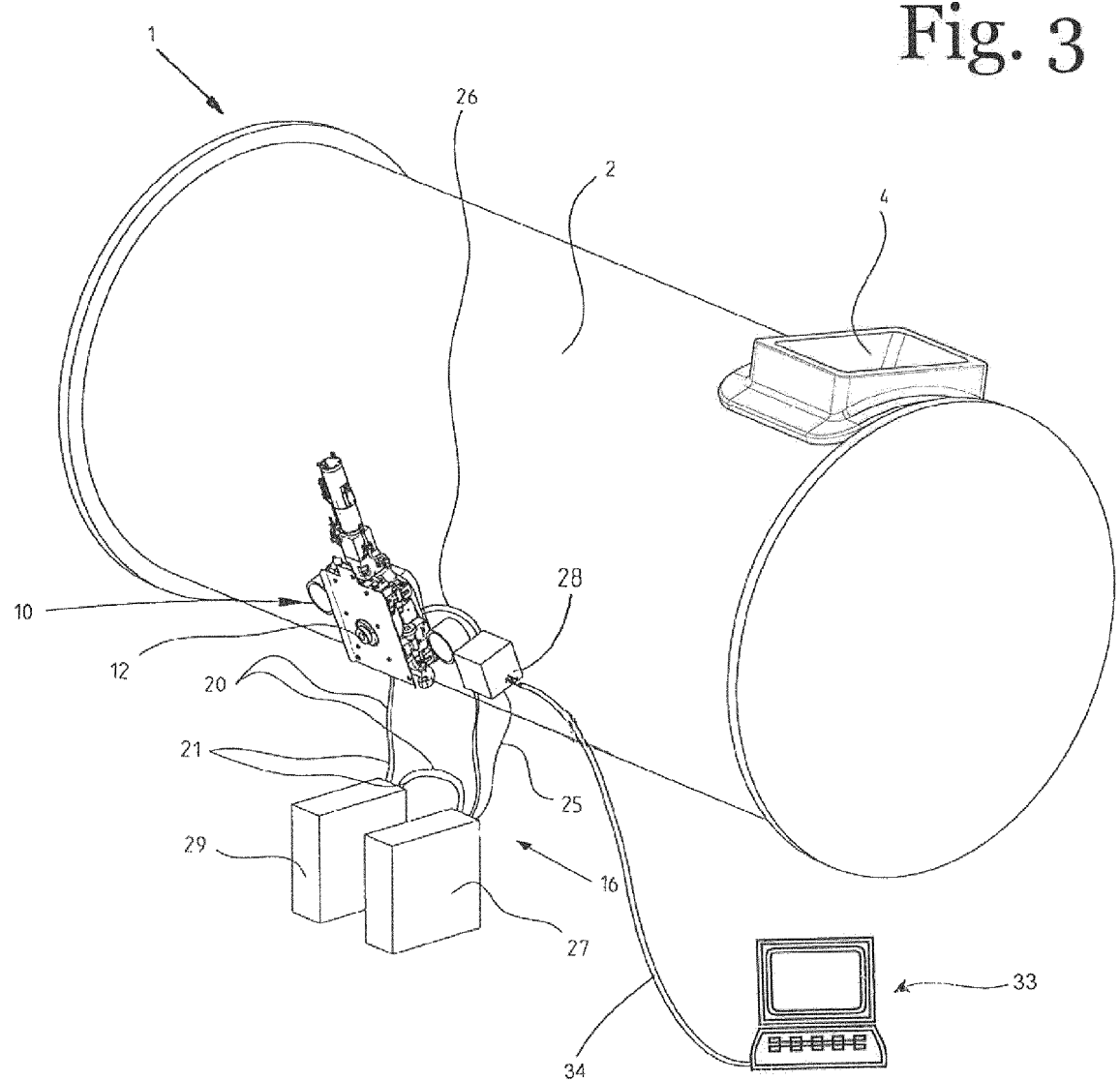
FIG. 3 shows a copper anode furnace according to the invention with a device, illustrated perspectively.

This respective coil 6', 11', 13' is connected by a lead 34, like that for the lead 26 for the induction coil 15 with an external supply or evaluation unit 33, as can be seen in FIG. 3.

These electrically conducting coils 6', 11', 13' respectively surround the passage opening of the refractory member 6, 11, 13 advantageously coaxially, and are formed from one or preferably multiple windings. They are provided with a lead passing outside the refractory member. They are thus constructed with a sufficient number of windings that adequate measurement conditions can be obtained with them.

Based on the voltage, current and frequency produced in the coil by the supply unit, the complex resistance (Z), the complex angle ($\varphi$) and/or the current (I) of the impedance.

The measurement conditions of the impedance and/or the induced current profile are determined before, during and/or after pouring in the various conditions, of the proportion of slag in the melt or the wear in the spout 5 and are saved as calibrating reference values, which are compared with the actual measured values during and/or after pouring and the magnitudes are derived from them.

The measurement states of the impedance can also be determined before, during and/or after pouring in the new condition of the spout and during pouring only of metal or only of slag in this new condition of the spout and the actual values are compared and evaluated with this initial condition.

Figure 2:
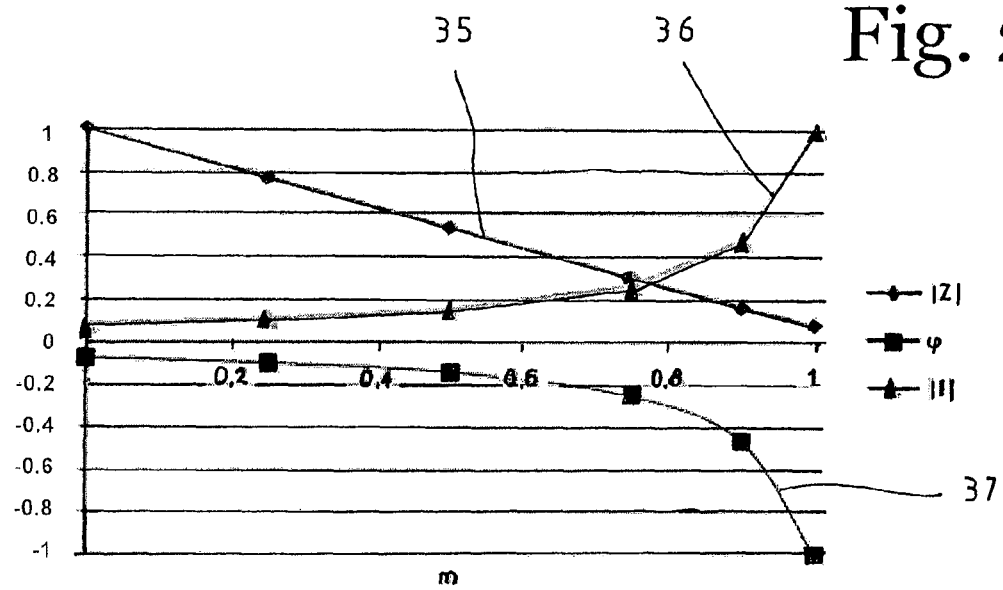
FIG. 2 is a graph with a standardized curve of the current, the complex resistance, the complex angle of the impedance in a coil as a function of the mixture ratio of metal melt to slag according to the abscissa.

FIG. 2 shows a graph with a standardized curve, not in absolute numbers, of current [I], the complex resistance [Z] and the complex angle [$\varphi$] of the impedance in a coil as a function of the mixture ratio m of melt to slag. The mixture ratio m is indicated on the abscissa between 0 and 1 of the proportion of metal (copper) from 0 to 100%, while on the ordinate are standardized or ratio values between −1 and +1.

It can be seen that the complex resistance [Z] increases approximately in proportion to the decrease of the metal fraction according to the curve 35 of the alternating current in the coil at 50 Hz. The curves 36 and 37 with the current [I] and the complex angle [$\varphi$] run approximately symmetrically to the zero line and these vary with the reduction of the proportion of metal, initially very closely and at approximately more than 80% metal fraction the curve transposes into a proportionally smaller decrease towards zero. This confirms that the proportion of slag in the outflowing metal melt can be accurately determined from the impedance.

In order to monitor the at least one, preferably various variables, within the scope of the invention, a temperature measurement is also made in the region of the outlet opening 12 and/or at the induction heater 14. For expedience, at least one sensor is installed in the said region, connected via a lead to the evaluation unit and is used for determination of variables or comparison with reference values and, where there are appropriate deviations, the closure member for the spout can be actuated, metal in the outlet channel can be heated and/or renewal of the outlet channel can be initiated. This attention to the temperature in the spout 5 can also be coordinated or compared with the determination of the impedance, so that compensation can be made for errors in the measurements.

In order to optimize the heating effect of the induction coil 15 in the outlet channel 12 of the spout, an annular insert 30, preferably made of graphite or a material containing graphite, is provided in the inner casing 13 in the region of the induction coil 15. Advantageously, the insert 30 is provided with an insulating layer on the rear side or on both front sides.

The inner casing 13 is provided with a hard layer 31, preferably made of clay $Al_2O_3$ or SiC, in the region of the insert 30, by means of which layer the inner surface of the insert is protected against the outflowing melt or the slag or oxidizing gas, such as for example air. The hard layer 31 may optionally be extended beyond the annular insert 30. In order to facilitate fitting, the inner casing 13 is centered in the housing 9 and in the spacer ring 24 and is inserted into the perforated brick 11 from the outside.

FIG. 3 illustrates a copper-anode furnace 1 with a slide closure 10 fitted to its spout, which slide closure comprises a furnace drum having a steel cladding 2 and a filling opening 4. The copper melt that is cleaned in the furnace by a special treatment is then poured through the slide closure 10 which is fitted on the spout on the periphery of the furnace drum.

In the copper-anode furnace 1, an external generator 27 and a transformer 28 connected to the latter via lines 25, are preferably provided in the spout for the operation of the induction heater 14, said transformer being attached, for example, to the furnace 1. In addition, this power supply line 26 leading from the transformer 28 to the induction coil 15 as well as the cooling line are provided. The generator and the transformer could also be formed as one unit and be attached to the furnace or be positioned separately from the latter.

Furthermore, as already explained above, the respective coil 6', 11', 13' is connected by a lead 34 to an external supply or evaluation unit 33, by means of which this detection is made in accordance with the invention. It would also be possible to integrate the supply unit for the coils in the generator 27.

By means of a cooling system 16 having a cooling unit 29 and feed and return lines 20, 21 on the one hand, coolant is conveyed into the induction coil 15 and the cooling chambers 18, 19 of the induction heater 14, and on the other hand to the generator 27 and the transformer 28 with sufficient cooling capacity.

The invention can basically also be used in all metallurgical furnaces the spout of which is provided with a slide closure disposed on the end of the spout.

The induction heater 14 according to the invention is activated either manually or automatically in cooperation with the actuation device of the slide closure. Depending on the type or structure of the furnace, a number of induction coils distributed over the length of the spout can be included.

Figure 4:
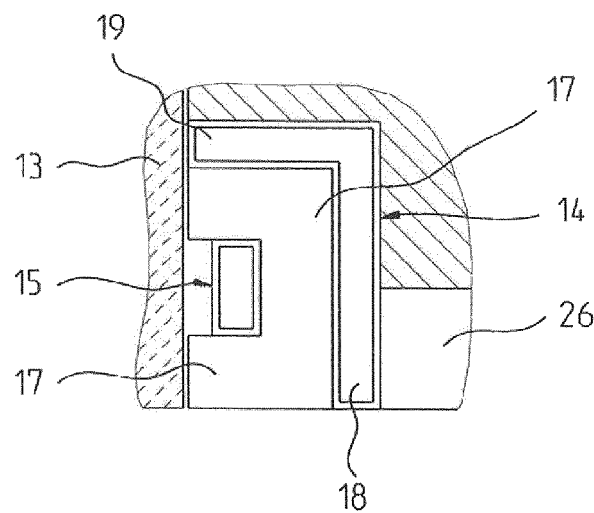
FIG. 4 is an enlarged schematic cross-section through an induction heater in the spout according to FIG. 1.

As is evident from FIG. 4, the induction coil 15 is embedded in a supporting body 17 made of ferritic material. The supporting body 17 along with the cooling chambers 18, 19 surrounding it are fitted in the support plate 23. Furthermore, the induction heater 14 is advantageously encased on the rear and side walls with an insulating layer. In addition, a spacer ring 24, preferably made of copper material, is inserted between this supporting body 17 and the slide closure 10. This spacer ring 24 likewise serves to center the inner casing 13 in the spout 5. However, two separate rings could also be provided. A longitudinally running line with a groove or the like for receiving at least one line 26, such as a power supply line and a coolant line, for the induction coil 15 is also provided between the support plate 23, the holding plate 2' and the housing 9.

The housing 9 is fastened to the support plate 23 or the holding plate 2' and can be separately fitted and removed together and with the inner casing 13 from the induction heater 14 with the supporting body 17, the induction coil 15 and the cooling chambers 18, 19.

Instead of a copper anode furnace, it would also be possible to provide other vessels with the slide closure or a like closure device as, for example, a copper converter with a taphole, constructed from several juxtaposed pipes without perforated brick, a flash smelting furnace, an electric melting furnace or similar metallurgical vessel.

The method in accordance with the invention for detecting the variables specified is advantageously suited for a spout provided as outlet of a copper converter. The at least one coil is embedded in one of the multiple juxtaposed pipes (tapping bricks) or in an intermediate sleeve as refractory element surrounding them. Where determination is by means of impedance, in particular it is possible to establish the degree of wear of the refractory elements, the solidified metal melt and/or plugging material in the outlet and their condition can be established in a simple manner and where necessary measures can be taken immediately, firstly to replace the refractory members in a worn condition and secondly, to prevent a breakthrough in the converter being at risk due to worn out refractory members.

Within the scope of the invention, another closure member can be used instead of a sliding closure, for example a plug closure, by means of which the spout can be opened or closed in a known manner from the inside of the vessel or from outside. A plugging material can also be used as closure member for closing the outlet in a known way from outside, for example one containing aluminium oxide and being deformable.

With an outlet without closure member, for example a free-running nozzle with a tundish, a coil could also be embedded in a refractory member and, using the method in accordance with the invention, at least the wear condition of the refractory member forming the outlet can be determined.

The invention claimed is:

1. Method for detecting at least one variable relating to a spout of a metallurgical vessel while metal melt passes through the spout of the metallurgical vessel, each of the at least one variable being selected from a group consisting of a proportion of slag during passage of the metal melt through the spout of the metallurgical vessel, a degree of wear of refractory parts defining an outlet channel of the spout, and an amount of solidified metal melt or plugging material in the outlet channel, the method comprising the steps of:
heating the metal melt in the outlet channel using an induction coil of an induction heater, the induction coil surrounding the outlet channel; and
monitoring the at least one variable using a supply and evaluation unit electrically connected to the induction coil and while the metal melt passes through the outlet channel and is being heated by the induction coil, by producing an alternating current with a predetermined frequency in the induction coil as the metal melt is being heated by the induction coil; and determining impedance of the induction coil resulting from the alternating current in the induction coil which varies relative to the at least one variable such that at least one value of the at least one variable is determined based on the determined impedance;

whereby, based on the determined the at least one variable, a closure member for the spout is actuated, heating the metal melt in the outlet channel is adjusted or relining of at least one of the refractory parts defining the outlet channel is undertaken.

2. The method of claim 1, wherein the step of monitoring the at least one variable, using the supply and evaluation unit electrically connected to the induction coil and while the metal melt passes through the outlet channel and is being heated, further comprises:

determining induced current flow in the induction coil which varies relative to the at least one variable such that at least one value of the at least one variable is determined based on both the determined impedance and the induced current flow.

3. The method of claim 1, further comprising obtaining and saving calibrating reference values for the at least one variable in association with different impedances of the induction coil, and wherein the step of determining impedance of the induction coil such that the at least one value of the at least one variable is determined based on the determined impedance comprises comparing the determined impedance of the induction coil to impedances associated with the saved calibrating reference values.

4. The method of claim 3, wherein the step of obtaining and saving calibrating reference values for the at least one variable in association with different impedances of the induction coil comprises establishing or determining different values of the at least one variable during and after passage of the metal melt through the outlet channel while the induction coil has a known impedance.

5. The method of claim 1, wherein the step of determining impedance of the induction coil comprises determining variations of the impedance based on voltage, current and frequency produced in the induction coil by the supply and evaluation unit, wherein a complex resistance (Z), a complex angle ($\varphi$) and/or current (I) of the impedance is/are determined by the supply and evaluation unit.

6. The method of claim 1, wherein the step of monitoring the at least one variable, using the supply and evaluation unit electrically connected to the induction coil and while the metal melt passes through the outlet channel and is being heated, further comprises at least one of:

measuring temperature in a vicinity of the outlet channel; and measuring temperature at the induction heater; and wherein at least one value of the at least one variable is determined based on both the determined impedance and the measured temperature.

7. The method of claim 6, further comprising:

comparing, using the supply and evaluation unit, measured temperature to reference temperature values associated with the at least one variable; and when the measured temperature deviates from the reference temperature values, performing at least one of:
actuating the closure member for the spout,
adjusting heating of the metal melt in the outlet channel, and
relining the outlet channel.

8. The method of claim 1, wherein the refractory parts defining the outlet channel comprise a refractory brick including an electrically conducting coil, an inner casing including an electrically conducting coil, an annular insert including an electrically conducting coil, and a closure plate including an electrically conducting coil, the coil in the refractory brick, the coil in the inner casing, the coil in the annular insert and the coil in the closure plate being electrically connected to the supply and evaluation unit, the method further comprising the steps of:

producing using the supply and evaluation unit, alternating current in the coil in the refractory brick, the coil in the inner casing, the coil in the annular insert and the coil in the closure plate; and wherein the step of monitoring the at least one variable, using the supply and evaluation unit electrically connected to the induction coil of the induction heater and while the metal melt passes through the outlet channel and is being heated, further comprises:

determining impedance of at least one of the coil in the refractory brick, the coil in the inner casing, the coil in the annular insert and the coil in the closure plate which varies relative to the at least one variable such that at least one value of the at least one variable is determined based in part on the determined impedance of at least one of the coil in the refractory brick, the coil in the inner casing, the coil in the annular insert and the coil in the closure plate.

9. The method of claim 1, wherein the refractory parts defining the outlet channel comprise a refractory brick including an electrically conducting coil, an inner casing including an electrically conducting coil, and a closure plate including an electrically conducting coil, the coil in the refractory brick, the coil in the inner casing, the coil in the annular insert and the coil in the closure plate being electrically connected to the supply and evaluation unit, the method further comprising the steps of:

producing using the supply and evaluation unit, alternating current in the coil in the refractory brick, the coil in the inner casing and the coil in the closure plate; and wherein the step of monitoring the at least one variable, using the supply and evaluation unit electrically connected to the induction coil of the induction heater and while the metal melt passes through the outlet channel and is being heated, further comprises:

determining impedance of at least one of the coil in the refractory brick, the coil in the inner casing and the coil in the closure plate which varies relative to the at least one variable such that at least one value of the at least one variable is determined based in part on the determined impedance of at least one of the coil in the refractory brick, the coil in the inner casing and the coil in the closure plate.

10. The method of claim 1, wherein the metallurgical vessel is a copper anode furnace or a copper converter.

11. A device for performing the method of claim 1, wherein the outlet opening is formed by a slide closure unit on the spout of the metallurgical vessel, the metallurgical vessel including a housing, refractory closure plates in the housing, at least one connecting refractory inner casing in the housing, the induction coil at least partially surrounding the at least one refractory inner casing, the supply and evaluation unit detecting or measuring the least one variable.

12. The device of claim 11, wherein the metallurgical vessel is a copper-anode furnace, the induction heater is removable and the supply and evaluation unit is electrically connected to the induction coil by leads.

13. The device of claim 11, further comprising cooling chambers around the spout and the induction coil.

14. The device of claim 11, further comprising:
a supporting body including ferritic material, the induction coil being embedded in the supporting body;
a first cooling chamber that surrounds the supporting body peripherally; and
a second cooling chamber adjacent to a wall of the supporting body on a side closer to the metallurgical vessel.

15. The device of claim 14, further comprising:
a support plate fastened to the spout, the supporting body and the first and second cooling chambers being removable from the support plate; and
a spacer ring supported against the supporting body between the support plate and the slide closure unit.

16. The device of claim 14, further comprising a cooling system that provides coolant to the induction coil and the first and second cooling chambers, the cooling system including a cooling unit proximate the metallurgical vessel.

17. The device of claim 16, wherein the cooling system is configured to cause solidification of the metal melt or slag in the spout of the metallurgical vessel.

18. The device of claim 11, further comprising a generator and a transformer that supply power to the induction coil.

19. The device of claim 11, wherein the supply and evaluation unit is configured to detect when slag reaches the spout at the end of a pouring operation using the induction coil, whereby the slide closure unit is closable automatically when the supply and evaluation unit detects that the slag has reached the spout at the end of the pouring operation.

* * * * *